United States Patent [19]

Leeper et al.

[11] Patent Number: 4,657,466
[45] Date of Patent: Apr. 14, 1987

[54] APPARATUS FOR MOVING STRIPS USING MECHANICAL MANIPULATOR

[75] Inventors: Lloyd C. Leeper, Harrisburg; C. Thomas Mullen, Hummelstown, both of Pa.

[73] Assignee: Hershey Foods Corporation, Hershey, Pa.

[21] Appl. No.: 723,085

[22] Filed: Apr. 15, 1985

[51] Int. Cl.[4] .......................................... B65G 65/00
[52] U.S. Cl. ............................... 414/416; 198/468.2; 271/69; 271/308; 271/312; 294/103.1; 414/741; 901/7; 901/39
[58] Field of Search ............... 414/416, 739, 741; 901/39, 7; 294/103.1, 88, 67.22; 198/468.2; 271/69, 70, 84, 198, 308, 312

[56] References Cited

U.S. PATENT DOCUMENTS

| | | | |
|---|---|---|---|
| 3,865,421 | 2/1975 | Pfeifer | 294/67.22 |
| 3,938,847 | 2/1976 | Peyton | 414/416 X |
| 3,995,757 | 12/1976 | Runyan et al. | 414/416 |
| 4,030,746 | 6/1977 | Langowski | 294/88 |
| 4,056,188 | 11/1977 | MacFarlane et al. | 901/39 X |
| 4,266,819 | 5/1981 | Pemberton | 294/88 |
| 4,293,272 | 10/1981 | Jellema | 414/416 X |
| 4,302,142 | 11/1981 | Kuhl et al. | 414/416 X |
| 4,364,555 | 12/1982 | Wise | 271/308 |
| 4,482,289 | 11/1984 | Inaba et al. | 901/39 X |
| 4,493,604 | 1/1985 | Walker | 294/67.22 X |
| 4,504,186 | 3/1985 | Richards | 198/468.2 X |

Primary Examiner—Joseph E. Valenza
Assistant Examiner—David A. Bucci
Attorney, Agent, or Firm—Paul & Paul

[57] ABSTRACT

In the commercial production of licorice bites, each about 1 inch long, a group of extruded 54-inch licorice strips are lifted by a programmable controlled robot from the discharge end of a lower conveyor and deposited at the input end of an upper conveyor which carries the strips to a cutting station. The robot hand has a lower stainless steel blade for insertion under the group of licorice strips to wedge the sticky strips from a board on which they are being carried by the lower conveyor. The robot hand includes an upper bar having a food-grade rubber undersurface. The bar is lowered relative to the blade after insertion of the blade under the licorice strips, thereby clamping the strips between the lowered bar and the blade. The arm of the robot then lifts the hand and clamped group of licorice strips and deposits the front ends of the strips at the input of the upper conveyor.

17 Claims, 8 Drawing Figures

APPARATUS FOR MOVING STRIPS USING MECHANICAL MANIPULATOR

BACKGROUND OF THE INVENTION

This invention relates to the commercial production of licorice bites.

In the commercial production of licorice, the licorice mix is extruded through orifices to form strips. In a typical case, a group, for example, of fifteen or sixteen strips of licorice each, for example, 54 inches long, are extruded and deposited in parallel manner directly onto a rectangular board for transport, as by a conveyor, through a dryer and then to a further position at which the strips of licorice are lifted from the board and raised to the level of a second conveyor which carries the 54-inch strips to a cutter position at which the strips are severed into "bite" length, for example, one inch.

Licorice strips are made from a mix which includes among its ingredients flour, water, sugar and flavoring. Due largely to the presence in the mix of a substantial quantity of sugar, as the extruded licorice strips pass through the dryer they become tacky and tend to stick to the board on which they are being transported.

In the prior art, the sticky strips of licorice are lifted manually, as by the hand of an operator, and placed on a second upper conveyor which carries the strips to a cutting position at which they are reduced to "bite" length. The use of a second conveyor is necessary because the strips must be removed from the board before the board reaches the cutter.

SUMMARY OF THE PRESENT INVENTION

A principal object of the present invention is to reduce the cost of production of licorice bites by providing automatic equipment for lifting a group of extruded licorice strips from a transport board onto a second conveyor which carries the strips to a cutter where the 54-inch strips of licorice are reduced to bite size.

The foregoing object is accomplished, in accordance with the present invention, by providing an automatically controlled mechanical manipulator or robot to lift the extruded 54-inch licorice strips from the transport boards onto the second conveyor.

DETAILED DESCRIPTION OF THE PREFERRED EMBODIMENTS

In accordance with the present invention, a commercially available mechanical manipulator or robot 10 is equipped with a specially designed "hand" 20 for lifting a group of licorice strips from a board onto which the strips were extruded and carried through a dryer by a conveyor. The group may, for example, comprise fifteen or sixteen strips each 54 inches long, disposed on the board in parallel relation. The strips are tacky and tend to stick to the board.

Figure 1:
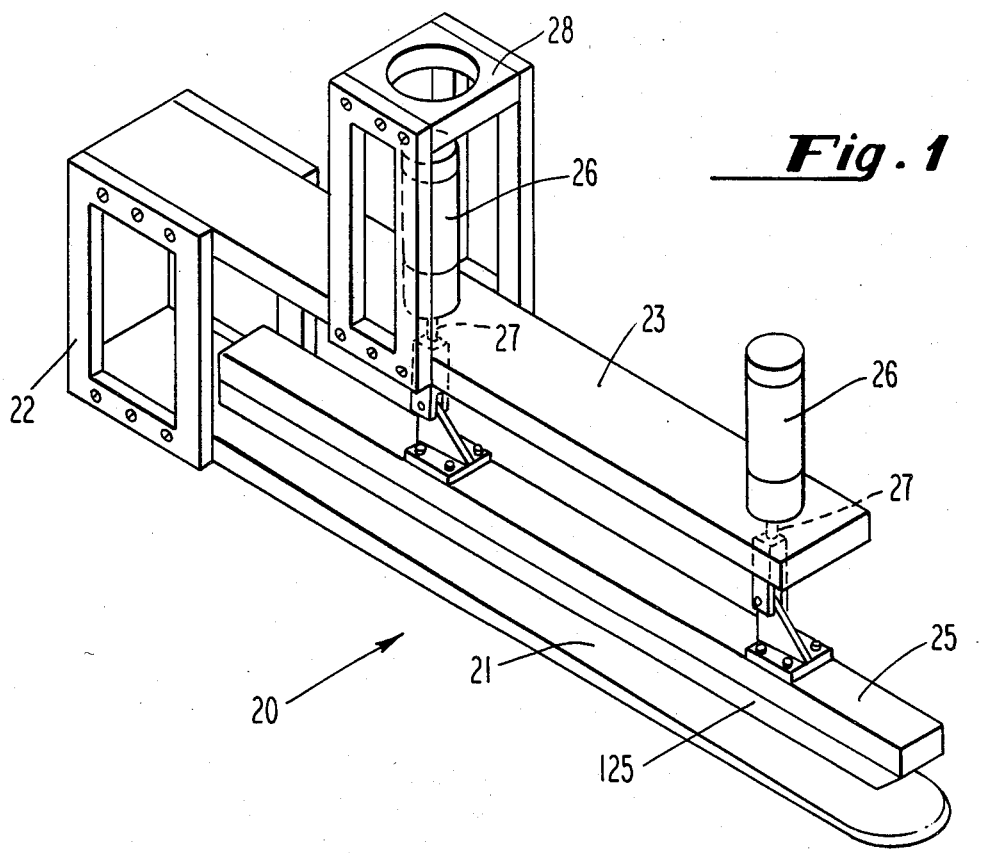
FIG. 1 is a perspective view of the "hand" of the mechanical manipulator or robot.

The robot hand 20, illustrated in FIG. 1, comprises a frame 22 which supports a lower blade 21 which projects forwardly therefrom. Blade 21 has a tapered front edge and functions as a spatula. It is preferably made of stainless steel. Hand frame 22 also supports a forwardly-extending upper support bar 23 which in turn supports a vertical frame member 28 which is designed to be attached to the wrist 15 of the robot 10. Upper support bar 23 also supports a pair of vertically oriented air cylinders 26 the pistons 27 of which are attached to a clamping bar 25 positioned above the lower blade 21 in coaxial alignment therewith. Secured to the undersurface of bar 25 is a strip of food-grade rubber 125. Bar 25 and its rubber undersurface 125 are narrower than lower blade 21. For example, blade 21 may be 2 inches wide and bar 25 and its rubber undersurface may be 1 inch wide.

The mechanical manipulator or robot 10 is a commercially available item. It may, for example, be an ASEA industrial robot and may be obtained, along with the programmable controller, from ASEA Robotics, Inc., 16250 West Glendale Drive, New Berlin, Wis.

Figure 2:
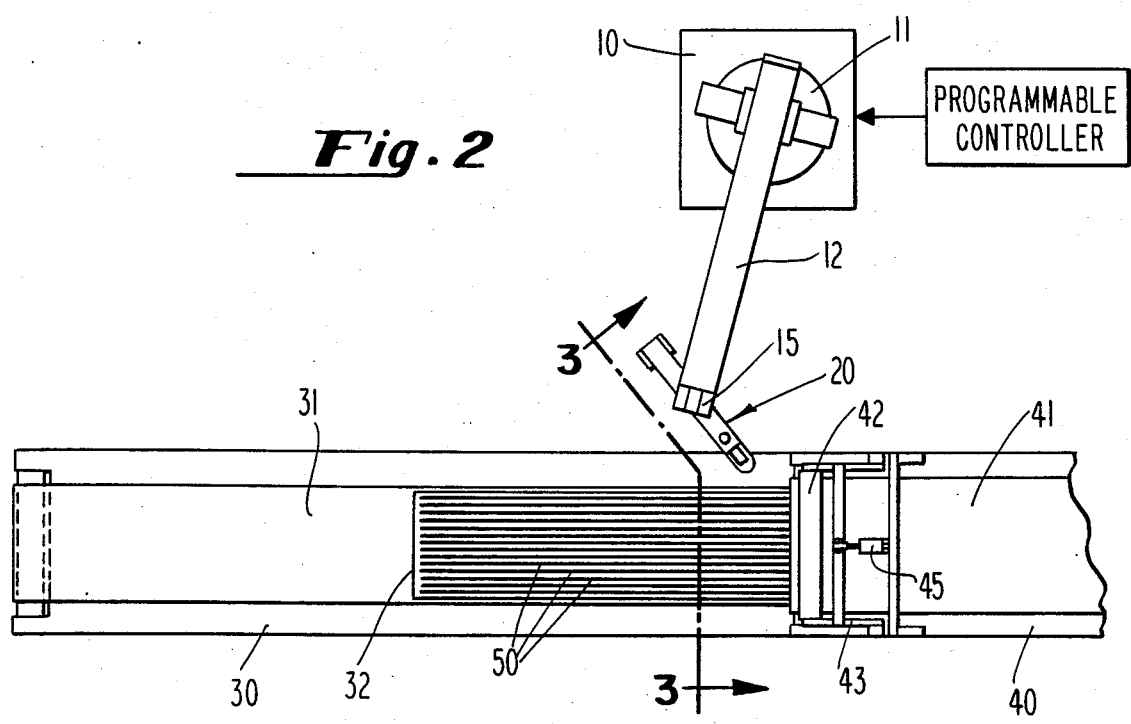
FIG. 2 is a top plan view illustrating diagrammatically the robot and the hand of the robot before it is inserted into position to lift a group of parallel licorice strips.

As illustrated in FIG. 2, robot 10 is controlled by a Programmable Controller housed in a control cabinet located near the robot. The body 11 of the robot 10 has rotary movement, arm 12 has both radial and vertical movement, and wrist 15 has rotary, bending and sweep movement. The robot also has horizontal travel.

In FIG. 2 of the drawing, the hand 20 of the robot is shown in a position to one side of a conveyor 31 which is transporting a group of licorice strips 50 on a board 32 to a lifting station at which the group of licorice strips are to be lifted from board 32 and placed on an upper second conveyor 41 for transport to a cutting station. Conveyors 31 and 41 are supported on frames 30 and 40, respectively.

Figure 3:
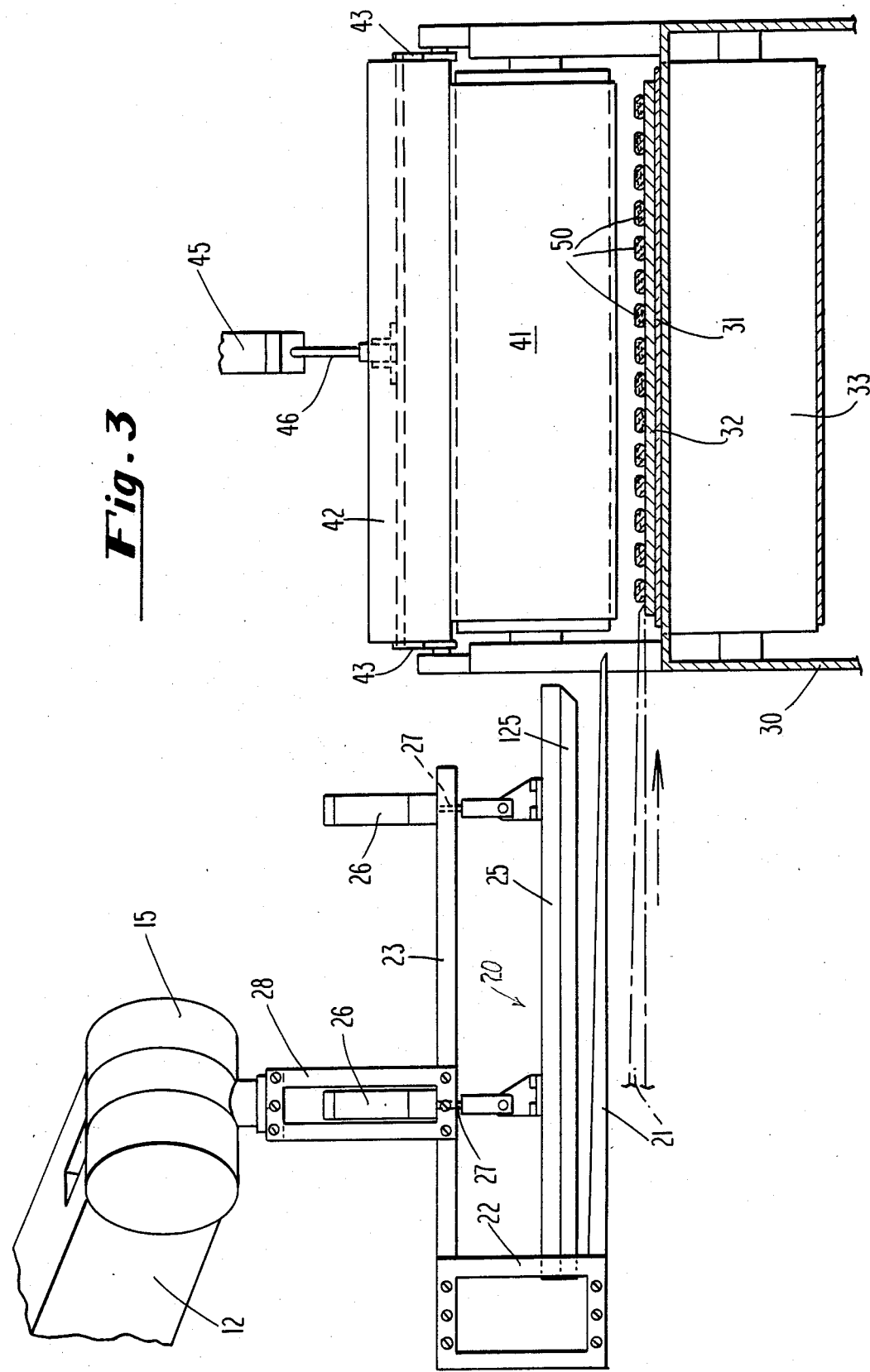
FIG. 3 is a view looking along the line 3—3 of FIG. 2 showing in side elevation the robot hand and showing in end elevation a conveyor which transports a plurality of licorice strips on a board to a lifting position.

FIG. 3 is a view taken along the line 3—3 of FIG. 2, and shows the robot hand 20 in side elevation in the position which it occupies prior to being moved forwardly, by radial movement of robot arm 12, into a position in which the lower blade 21 is inserted under the plurality of licorice strips 50. In FIG. 3, the group of licorice strips 50 are shown resting on a board 32 which is being transported by the conveyor belt 31. Also seen in FIG. 3 is an upper conveyor 41, a pressure roller 42, an air cylinder 45 and a piston 46 by means of which pressure roller 42 is raised and lowered relative to upper conveyor 41.

Figure 4:
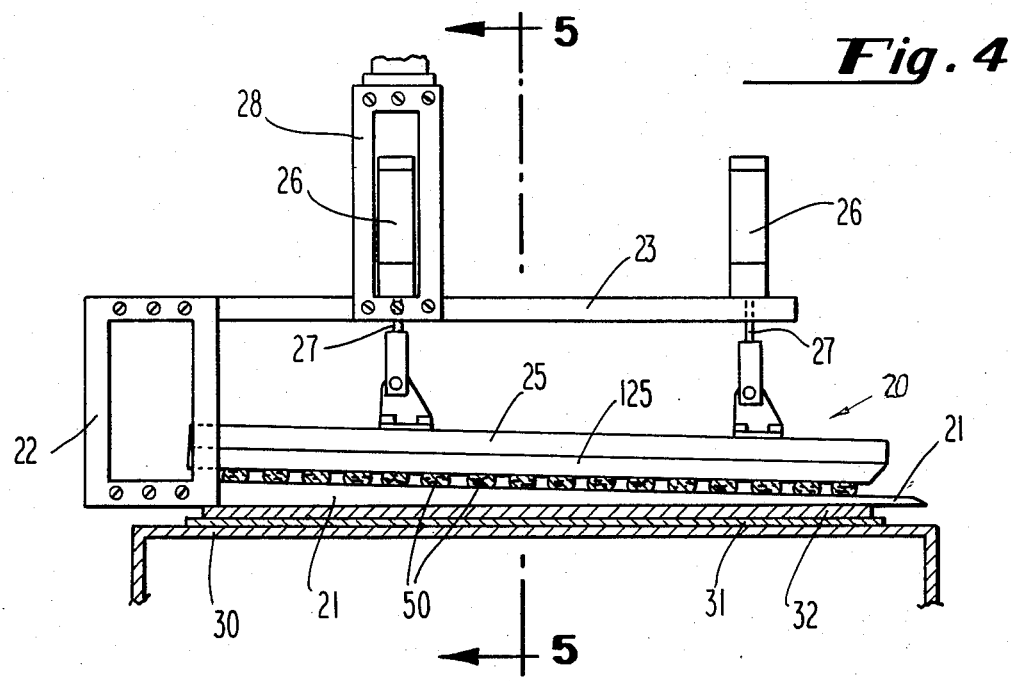
FIG. 4 is an elevational view showing the robot hand after it has been moved forwardly to a position in which it lifts the licorice strips from the board.

In FIG. 4, the robot arm 12 (see FIG. 2) has been moved radially counterclockwise, as viewed in FIG. 2, and hand 20 has been moved forwardly in such manner that lower blade 21 has wedged itself under the group of sticky licorice strips, thereby separating the licorice strips 50 from board 32. Following full insertion of blade 21 under the group of licorice strips 50, the upper arm 25 is lowered, by actuation of air cylinders 26, thereby causing the food-grade rubber 125 to press against the licorice strips. The entire group of licorice strips are now clamped, and gripped for lifting.

Figure 5:
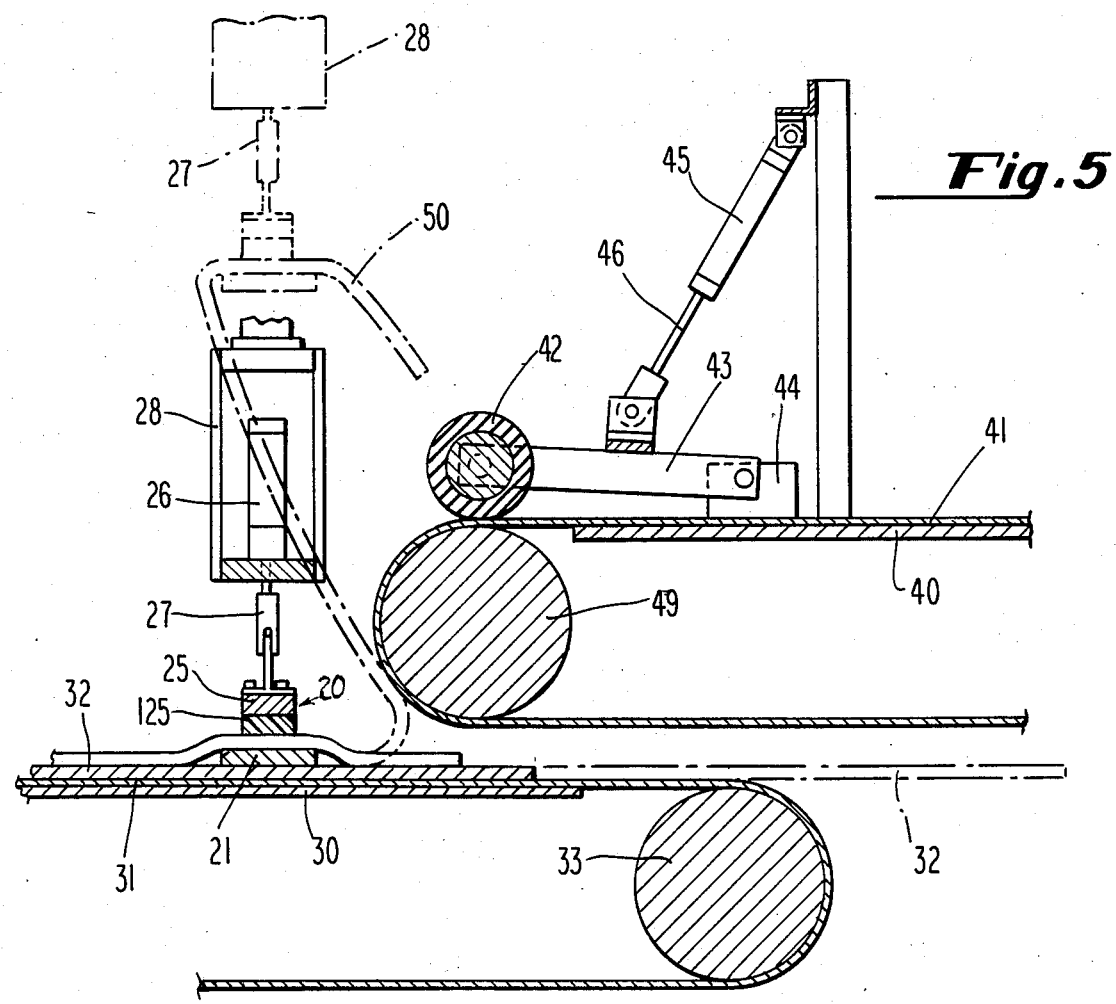
FIG. 5 is a side elevational view looking along the line 5—5 of FIG. 4 showing, in phantom, the robot hand lifting the forward ends of the group of licorice strips to a position above and in front of a second conveyor.

In FIG. 5, arm 12 of robot 10 (FIG. 2) has been raised vertically, thereby lifting the robot hand 20 vertically from the solid line position shown in FIG. 5 to the phantom position. This lifts the forward end of the group of licorice strips 50 to the position shown in phantom in FIG. 5. During this lifting action, the group of licorice strips 50 remain clamped between the lower blade 21 and the rubber 125 of the upper bar 25. Also, during this lifting action, conveyor 31 continues to move forwardly and as it does so the strips of licorice are peeled away from the board 32.

Figure 6:
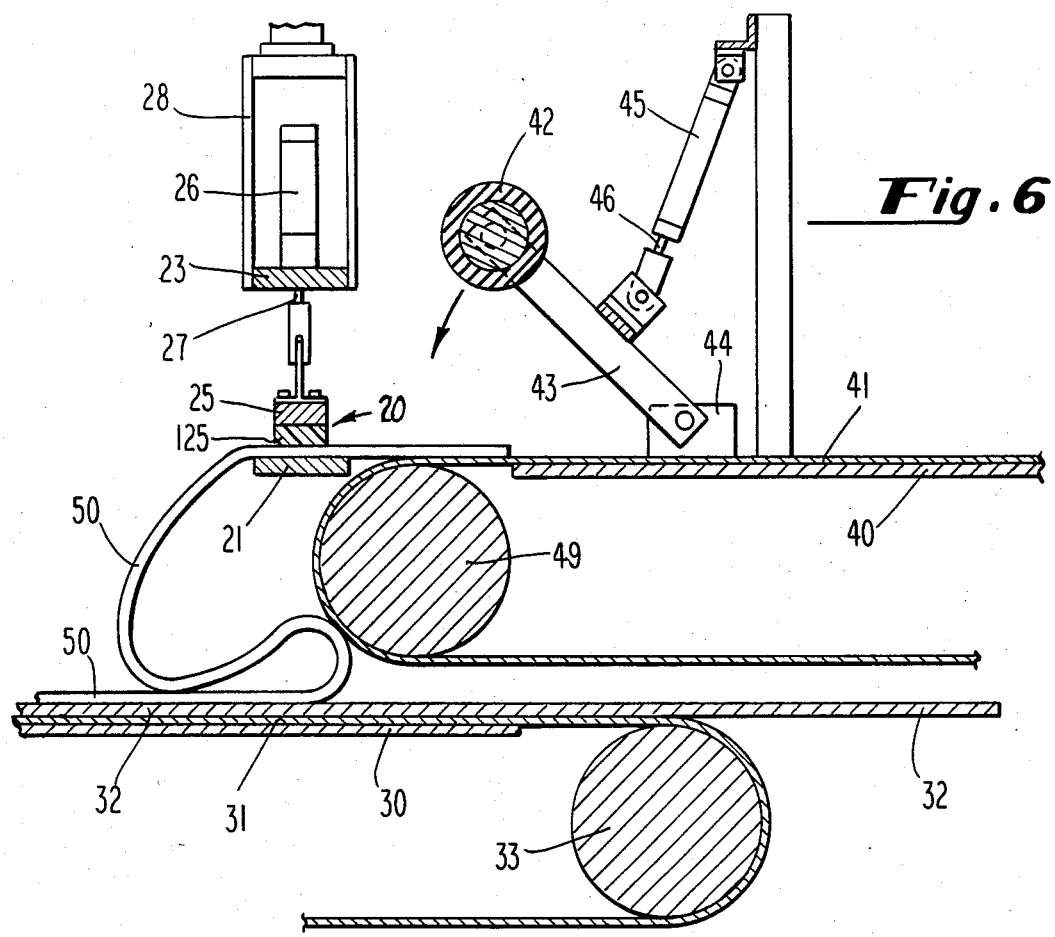
FIG. 6 is a view similar to that of FIG. 5 but showing the robot hand having lowered the licorice strips to a position such that the front portions of the licorice strips now rest on the second conveyor.

Immediately following the situation illustrated in FIG. 5, air cylinder 45 is actuated, thereby retracting piston 46 and pulling arm 43 pivotally upwardly about pivot block 44. This raises pressure roller 42 to a position illustrated in FIG. 6. With pressure roller 42 in raised position, robot arm 12 is now lowered, thereby lowering hand 20 to a position illustrated in FIG. 6 in which the forward ends of the group of licorice strips 50 rest on upper conveyor 41. At this time, upper conveyor 41 is preferably stopped. This avoids stretching of the still sticky licorice strips while they are still clamped by hand 20 of robot 10. During the action just described, lower conveyor 31 has continued to move forwardly and licorice strips 50 have continued to be peeled from board 32.

Figure 7:
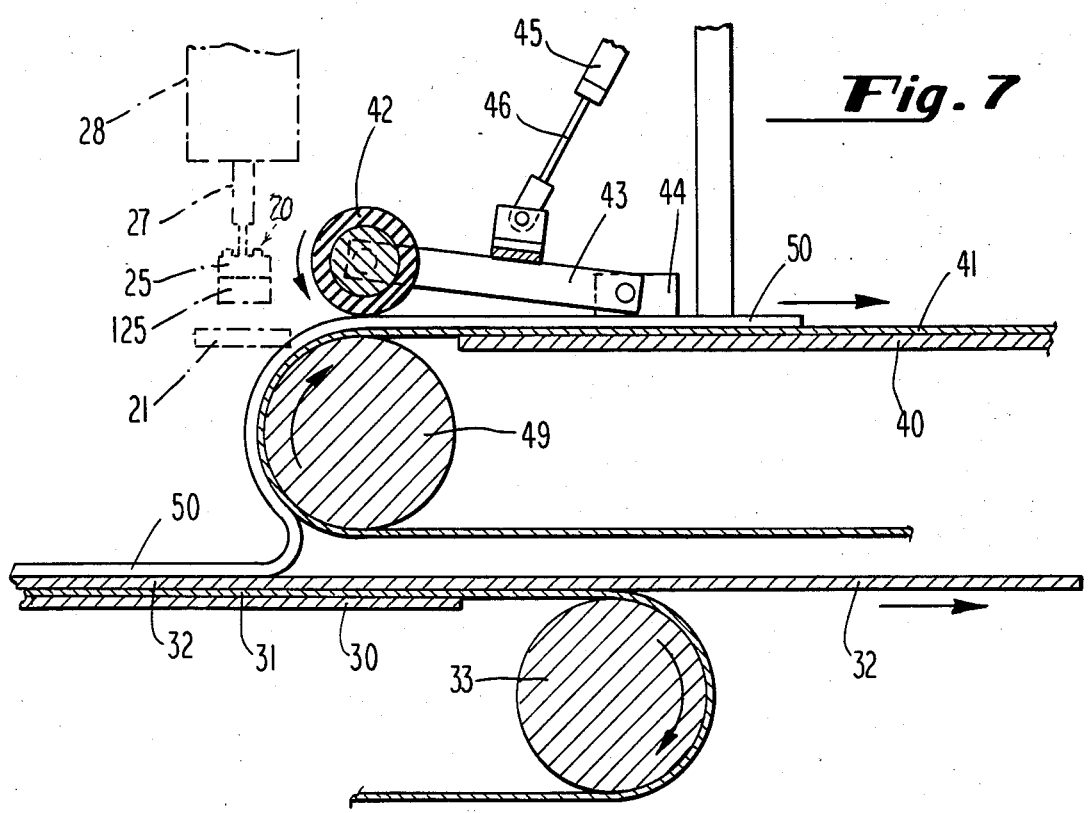
FIG. 7 is a view similar to that of FIG. 6 but illustrating, in phantom, the robot hand withdrawn from a position across the conveyor and in a position similar to that shown in FIG. 2.

In FIG. 7, the upper clamping bar 25 and foam rubber 125 have been raised relative to lower blade 21, thereby releasing the grip on licorice strips 50. With the grip now released, arm 12 of the robot 10 (FIG. 2) is moved radially clockwise to withdraw hand 20 from its position across conveyor 31 and to return it to a position shown in FIGS. 2 and 3. The group of licorice strips 50 are now carried forwardly on the upper or second conveyor 41 and the ends of the licorice strips are peeled from board 32 which continues to move forwardly on the lower conveyor 31.

Figure 8:
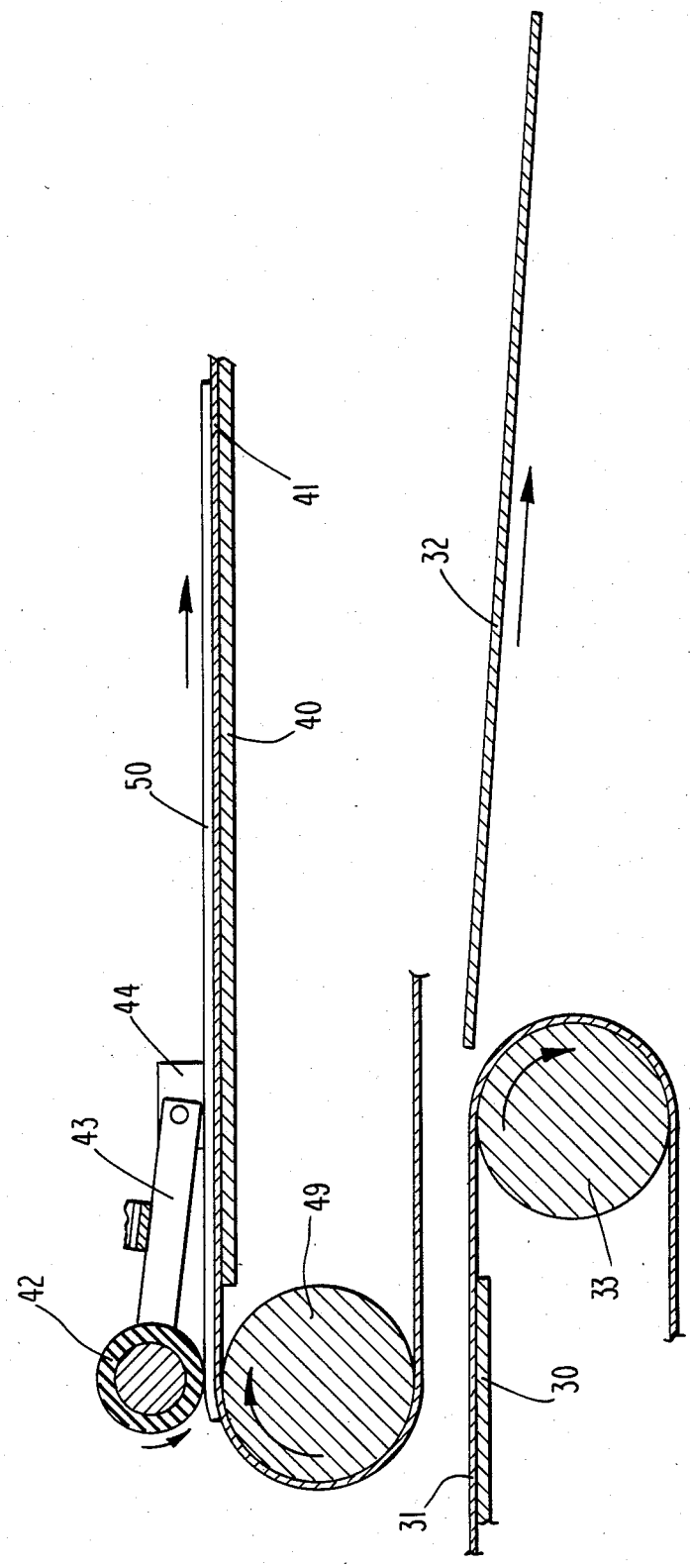
FIG. 8 is a view showing the group of licorice strips being conveyed by the second conveyor toward a cutter (not shown) at which the strips of licorice are reduced to bite size.

In FIG. 8, the group of licorice strips 50 is shown being carried on upper conveyor 41 toward a cutting mechanism, not shown, which reduces the licorice strips to bite size, and board 32 is shown being discharged through a space between lower conveyor 31 and upper conveyor 41. The cutting mechanism, which is referred to above but not shown, may preferably be of the type shown, described and claimed in our copending patent application entitled "Cutter and Ejector for Use in Manufacture of Licorice Bites", now U.S. Pat. No. 4,598,619, Apr. 15, 1985, under Ser. No. 725,094, and assigned to the assignee of the present application.

In the drawings, lower conveyor 31 is illustrated as being driven by drive roller 33 while upper conveyor 41 is illustrated as driven by drive roller 49.

We claim:

1. Apparatus for the production of licorice bites in which a plurality of elongated licorice strips are extruded and dried, said apparatus including:
   a. a board for carrying a group of licorice strips in substantially parallel lengthwise orientation;
   b. a lower conveyor for transporting said board and licorice strips to a lifting station;
   c. an upper conveyor having an input end at said lifting station, said input end being above and overlapping the discharge end of said lower conveyor;
   d. a programmably controllable robot positioned at said lifting station at one side of said lower and upper conveyors, said robot including an arm having vertical and radial movements, a wrist having at least rotary movement, and a mechanical hand attached to said wrist, said hand including: a frame member, a lower blade extending forwardly from a lower part of said hand frame member, a support bar extending forwardly from an upper portion of said hand frame member, a clamping bar positioned below said support bar and above said lower blade, and means supported on said support bar and connected to said clamping bar for lowering and raising said clamping bar relative to said lower blade;
   e. means for moving said robot arm radially in a direction to move said hand from a withdrawn position at one end of said conveyors to an extended position in which said lower blade wedges itself between said group of licorice strips and said board at the forward portion of said group;
   f. means for actuating said means for lowering said clamping bar into contact with said licorice strips for clamping said licorice strips between said clamping bar and said lower blade;
   g. means for moving said robot arm vertically upwardly to raise said hand thereby to raise said forward ends of said group of licorice strips to a position above the input end of said upper conveyor;
   h. means for moving said robot arm downwardly to cause the forward ends of said group of licorice strips to rest on the input end of said upper conveyor;
   i. means, including a pressure roller, for maintaining said group of licorice strips pressed against the surface of said upper conveyor;
   j. means for actuating said means for raising said clamping bar relative to said lower blade thereby to release the clamping by said robot hand of said group of licorice strips; and
   k. means for moving said robot arm radially in a direction to withdraw said robot hand to a position at one side of said conveyors.

2. Apparatus according to claim 1 wherein said clamping bar of said robot hand is provided with a food-grade rubber undersurface.

3. Apparatus according to claim 1 wherein said means for lowering and raising said clamping bar relative to said lower blade includes at least one cylinder and piston.

4. Apparatus for the production of licorice bites in which a plurality of elongated licorice strips are extruded and dried, said apparatus including:
   a. a board for carrying a group of licorice strips in substantially parallel lengthwise orientation;
   b. a lower conveyor for transporting said board and licorice strips to a lifting station;

c. an upper conveyor having an input end at said lifting station, said input end being above and overlapping the discharge end of said lower conveyor;

d. a mechanical hand at said lifting station, said hand including: a frame member, a lower spatula blade extending forwardly from a lower part of said hand frame member, a support bar extending forwardly from an upper portion of said hand frame member, a clamping bar positioned below said support bar and above said lower blade, and actuating means supported on said support bar and connected to said clamping bar for lowering and raising said clamping bar relative to said lower blade;

e. means for moving said hand from a withdrawn position at one end of said conveyors to an extended position in which said lower blade wedges itself between said group of licorice strips and said board at the forward portion of said group;

f. means for actuating said actuating means for lowering said clamping bar into contact with said licorice strips for clamping said licorice strips between said clamping bar and said lower blade;

g. means for raising said hand to raise said forward ends of said group of licorice strips to a position above the input end of said upper conveyor;

h. means for lowering said hand to lower the forward ends of said group of licorice strips to a position in which they rest on the surface of said upper conveyor at its input end;

i. means, including a pressure roller, for maintaining said group of licorice strips pressed against the surface of said upper conveyor;

j. means for actuating said actuating means for raising said clamping bar relative to said lower blade to release the clamping by said hand of said group of licorice strips; and k. means for withdrawing said hand to a position at one side of said conveyors.

5. Apparatus according to claim 4 wherein said clamping bar of said robot hand is provided with a food-grade rubber undersurface.

6. Apparatus according to claim 4 wherein said actuating means for lowering and raising said clamping bar relative to said lower blade includes at least one cylinder and piston.

7. Apparatus for moving strips, said apparatus including:

a. a board for carrying a group of strips in substantially parallel lengthwise orientation;

b. a lower conveyor for transporting said board and strips to a lifting station;

c. An upper conveyor having an input end at said lifting station, said input end being above and overlapping the discharge end of said lower conveyor;

d. a programmably controllable robot positioned at said lifting station at one side of said lower and upper conveyors, said robot including an arm having vertical and radial movements, a wrist having at least rotary movement, and a mechanical hand attached to said wrist, said hand including: a frame member, a lower blade extending forwardly from a lower part of said hand frame member, a support bar extending forwardly from an upper portion of said hand frame member, a clamping bar positioned below said support bar and above said lower blade, and means supported on said support bar and connected to said clamping bar from lowering and raising said clamping bar relative to said lower blade;

e. means for moving said robot arm radially in a direction to move said hand from a withdrawn position at one end of said conveyors to an extended position in which said lower blade wedges itself between said groups of strips and said board at the forward portion of said group;

f. means for actuating said means for lowering said clamping bar into contact with said strips for clamping said strips between said clamping bar and said lower blade;

g. means for moving said robot arm vertically upwardly to raise said hand thereby to raise said forward ends of said group of strips to a position above the input end of said upper conveyor;

h. means for moving said robot arm downwardly to cause the forward ends of said group of strips to rest on the input end of said upper conveyor;

i. means, including a pressure roller, for maintaining said group of strips pressed against the surface of said upper conveyor;

j. means for actuating said means for raising said clamping bar relative to said lower blade thereby to release the clamping by said robot hand of said group of strips; and k. means for moving said robot arm radially in a direction to withdraw said robot hand to a position at one side of said conveyors.

8. Apparatus according to claim 7 wherein said clamping bar of said robot hand is provided with a food-grade rubber undersurface.

9. Apparatus according to claim 7 wherein said means for lowering and raising said clamping bar relative to said lower blade includes at least one cylinder and piston.

10. Apparatus for moving strips, said apparatus including:

a. a board for carrying a group of strips in substantially parallel lengthwise orientation;

b. a lower conveyor for transporting said board and strips to a lifting station;

c. an upper conveyor having an input end at said lifting station, said input end being above and overlapping the discharge end of said lower conveyor;

d. a mechanical hand at said lifting station, said hand including: a frame member, a lower spatula blade extending forwardly from a lower part of said hand frame member, a support bar extending forwardly from an upper portion of said hand frame member, a clamping bar positioned below said support bar and above said lower blade, and actuating means supported on said support bar and connected to said clamping bar for lowering and raising said clamping bar relative to said lower blade;

e. means for moving said hand from a withdrawn position at one end of said conveyors to an extended position in which said lower blade wedges itself between said group of strips and said board at the forward portion of said group;

f. means for actuating said actuating means for lowering said clamping bar into contact with said strips for clamping said strips between said clamping bar and said lower blade;

g. means for raising said hand to raise said forward ends of said group of strips to a position above the input end of said upper conveyor;

h. means lowering said hand to lower the forward ends of said group of strips to a position in which they rest on the surface of said upper conveyor at its input end;
i. means, including a pressure roller, for maintaining said group of strips pressed against the surface of said upper conveyor;
j. means for actuating said actuating means for raising said clamping bar relative to said lower blade to release the clamping by said hand of said group of strips; and
k. means for withdrawing said hand to a position at one side of said conveyors.

11. Apparatus according to claim 10 wherein said clamping bar of said robot hand is provided with a food-grade rubber undersurface.

12. Apparatus according to claim 10 wherein said actuating means for lowering and raising said clamping bar relative to said lower blade includes at least one cylinder and piston.

13. Apparatus for transferring strips from a carrier member, said apparatus including:
    a. a first conveyor for transporting a carrier member and strips carried thereon along a path to a second transfer station;
    b. a second conveyor having an input end at said transfer station;
    c. a programmably controllable robot positioned at said transfer station, said robot including a mechanical hand and means for moving the hand through a plurality of movements, said hand including: a frame member, a blade extending forwardly from a lower part of said hand frame member, a clamping bar positioned relative to said blade and carried from said frame member, and means for effecting relative clamping and unclamping movement between said clamping bar and said blade;
    d. means for moving said robot hand from a position relative to the path of strips on a carrier member to an extended position relative thereto in which said blade wedges itself between said strips and the carrier member;
    e. means for actuating said means for effecting clamping movement whereby the strips become clamped between said clamping bar and said blade;
    f. means for moving said robot arm with at least a vertical component of movement to raise said hand thereby to raise at least the forward ends of strips and to deliver the forward ends of the strips to a resting position on the input end of said second conveyor;
    g. pressure means for maintaining the strips pressed against the surface of said second conveyor;
    h. means for actuating said means for effecting unclamping movement thereby to release the clamping by said robot hand of said strips; and
    i. means for moving said robot hand to withdraw said robot hand to a withdrawn position relative to said second conveyor.

14. Apparatus according to claim 13 wherein said means for effecting relative clamping and unclamping movement includes at least one cylinder and piston.

15. Apparatus for transferring strips from a carrier member, said apparatus including:
    a. a first conveyor for transporting a carrier member and strips carried thereon along a path to a transfer station;
    b. a second conveyor having an input end at said transfer station;
    c. a mechanical hand at said transfer station, said hand including: a frame member, a spatula blade extending forwardly from a lower part of said hand frame member, a clamping bar positioned relative to said blade and carried from said frame member, and means for effecting relative clamping and unclamping movement between said clamping bar and said blade;
    d. means for moving said hand from a withdrawn position relative to the path of strips on a carrier member to an extended position relative thereto in which said blade wedges itself between said strips and the carrier member;
    e. means for actuating said means for effecting clamping movement whereby the strips become clamped between said clamping bar and said blade;
    f. means for moving said hand with at least a vertical component of movement to thereby raise at least the forward ends of strips and to deliver the forward ends of the strips to a resting position on the input end of said second conveyor;
    g. pressure means for maintaining the strips pressed against the surface of said second conveyor;
    h. means for actuating said means for effecting unclamping movement thereby to release the clamping by said hand of the strips; and
    i. means for withdrawing the hand to a withdrawn position relative to said second conveyor.

16. Apparatus according to claim 15 wherein said actuating means for effective relative clamping and unclamping movement includes at least one cylinder and piston.

17. Apparatus according to any of claims 13 and 15, wherein the strips being transferred comprise a tacky substance that creates a tacky resistance to separation from each of the board and blade, and wherein the hand is moved with a vertical component of force comprising movement means sufficient to overcome the tacky resistance between the board and strips, and wherein the pressure means comprises sufficient pressure means to overcome the tacky resistance between the strips and the hand.

* * * * *